Feb. 8, 1966

N. J. CEDRONE 3,234,496

ELECTRONIC COMPONENT TESTING DEVICE

Filed April 1, 1963

INVENTOR.
NICHOLAS J. CEDRONE

BY *Kenway Jenney*
*& Hildreth*

ATTORNEYS

Feb. 8, 1966  N. J. CEDRONE  3,234,496
ELECTRONIC COMPONENT TESTING DEVICE
Filed April 1, 1963  4 Sheets-Sheet 2

*INVENTOR*
NICHOLAS J. CEDRONE
BY Kenway Jenney
& Hildreth
ATTORNEYS

Feb. 8, 1966 N. J. CEDRONE 3,234,496

ELECTRONIC COMPONENT TESTING DEVICE

Filed April 1, 1963 4 Sheets-Sheet 3

INVENTOR.
NICHOLAS J. CEDRONE
BY Kenway Jenney
& Hildreth
ATTORNEYS

Feb. 8, 1966  N. J. CEDRONE  3,234,496
ELECTRONIC COMPONENT TESTING DEVICE
Filed April 1, 1963  4 Sheets-Sheet 4
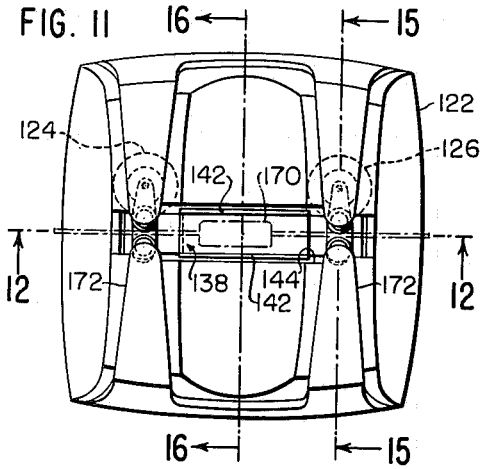
FIG. 11
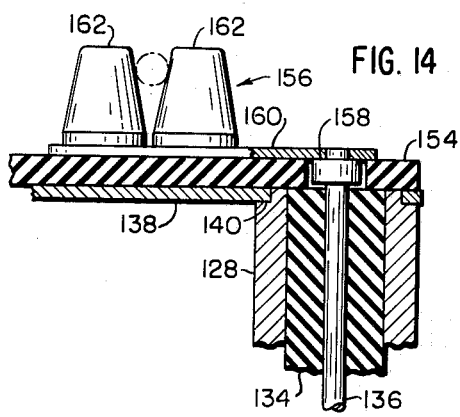
FIG. 14
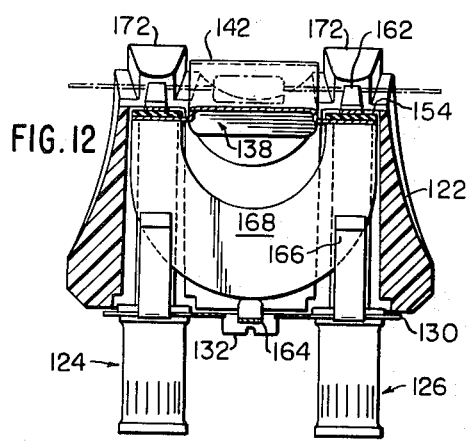
FIG. 12
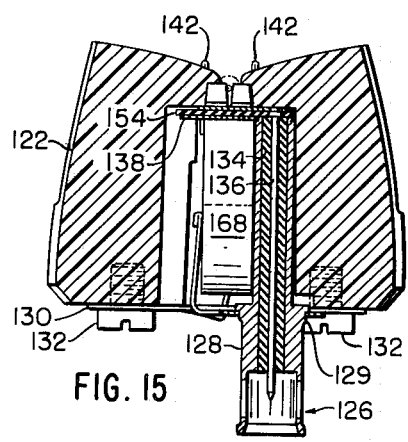
FIG. 15
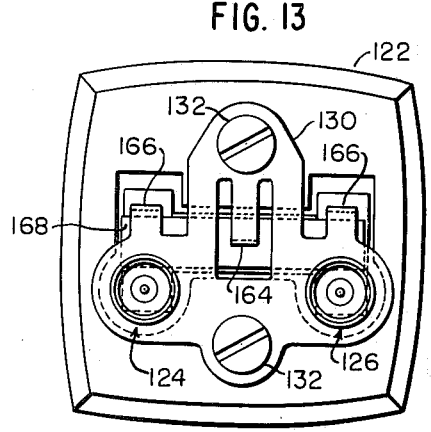
FIG. 13
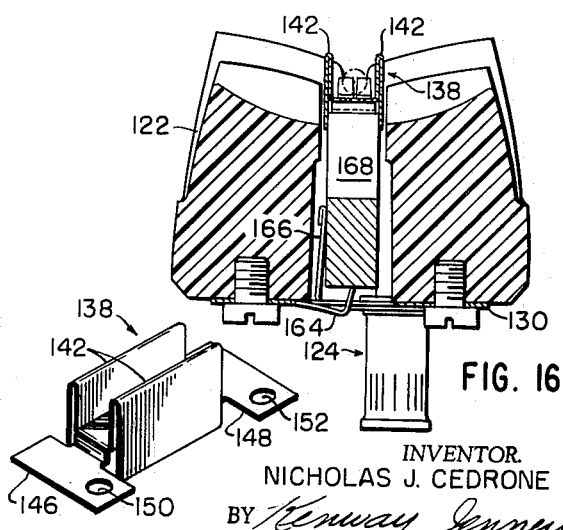
FIG. 16
FIG. 17
INVENTOR.
NICHOLAS J. CEDRONE
BY Kenway Jenney
& Hildreth
ATTORNEYS United States Patent Office 3,234,496
Patented Feb. 8, 1966

3,234,496
ELECTRONIC COMPONENT TESTING DEVICE
Nicholas J. Cedrone, 191 High St.,
Waltham, Mass. 02154
Filed Apr. 1, 1963, Ser. No. 269,609
17 Claims. (Cl. 339—12)

This application is a continuation-in-part of my copending application Serial No. 170,112, filed January 31, 1962, and now abandoned.

This invention relates to work holding and testing devices generally, and more particularly to novel and improved devices for holding electronic components such as semi-conductor diodes in order to test the components.

In the electronic industry it is a common practice to test many small components prior to shipment. These components for example may be semi-conductor diodes which comprise a small, usually cylindrical, body section with a pair of flexible wires or leads extending from the ends of the body of the diode. In testing such diodes, it is the practice to impress a voltage across the diode and to measure the voltage drop across the diode and the current flowing through it. In such testing of diodes or like components, it is desirable to provide some means for holding the diode while the leads are connected to a source of power and while the diode is connected to a testing device. Inasmuch as the components are often quite small, they are difficult to handle, thus usually resulting in an undesirably long time for testing each component. It is, of course, desirable that such testing be accomplished with a maximum of speed in order to maintain a relatively low cost.

The principal object of this invention, as noted, is to provide means for temporarily connecting the terminals of an electrical device, such as a diode, with the electrical terminals of a circuit adapted to subject the device to a test voltage, and thereby to measure its electrical properties.

It is well known to provide terminals for test circuits with mechanical fastening means such as spring clips or clamps, threaded pressure nuts, friction fittings and the like, but such devices are not adapted for rapid connection and disconnection. Also, unless care is taken in their use the contact pressure and hence the contact resistance may vary and thereby introduce errors in the test measurements. A second object of the invention is to eliminate cumbersome mechanical means for connection to the test circuit.

One known way to accomplish this is to provide magnetized contact terminals. These terminals attract and hold the leads of the device to be tested. In practice, this technique is not completely satisfactory. Variations occur in contact resistance resulting from the fact that the lead will tend to stick to the first part of the contact which it touches, and may not become fully seated in the test position. For example, if the contact has a notch for the lead intended to provide two lines or points of contact, one may find that the lead will not seat fully in the notch in certain instances; hence, that it will have only one line or point of contact rather than two. A third object of this invention is to utilize the principle of magnetic attraction while avoiding the uncertainties hitherto found in using magnetized terminals.

A fourth object is to utilize the principle of magnetic attraction not only to hold the leads of the device to be tested, but also to guide the leads to the contacts even when they are not precisely located thereon by the test operator.

Still another object is to achieve a high contact pressure in order to minimize contact resistance during the test. Also, it is desired to minimize the possibility of a reduction in contact pressure or an increase in contact resistance resulting from foreign matter such as dirt on or around the contacts. Still further, it is desired to minimize the hazard of shock due to voltages that may be applied between the terminals during the test. Also, it is desired to provide means of the foregoing type that have low capacitive coupling between the terminals, so that accurate measurements may be made of the high frequency and transient response characteristics of the device being tested.

Other objects will be in part obvious and in part pointed out more in detail hereinafter.

With the foregoing objects in view, the features of this invention reside in the features of construction embodied in the structures hereinafter severally described with reference to the appended drawings.

In the drawings, FIGS. 1 to 4 illustrate a first embodiment of the invention. FIG. 1 is a partially exploded perspective view of an electronic component testing device constructed in accordance with the present invention;

Figure 6:
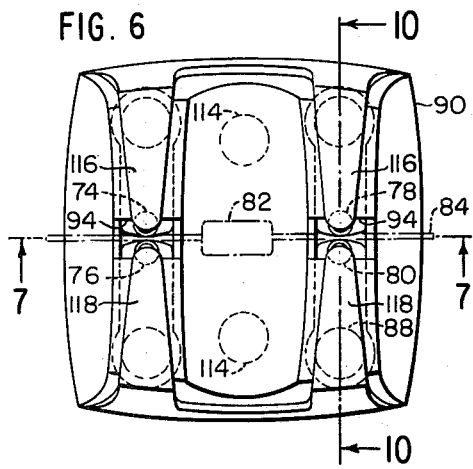
Figure 9:
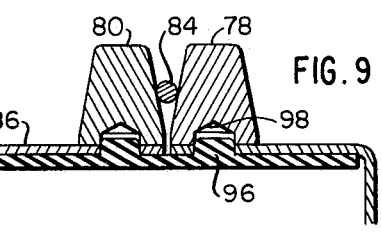
Figure 7:
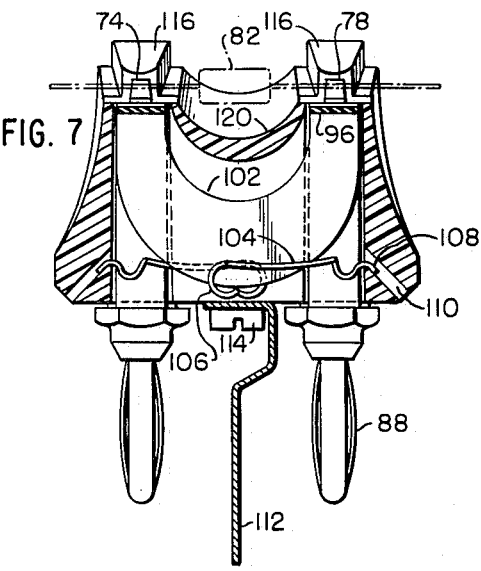
Figure 10:
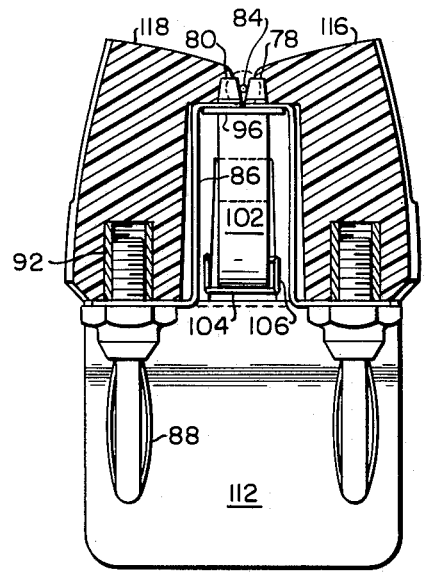
Figure 8:
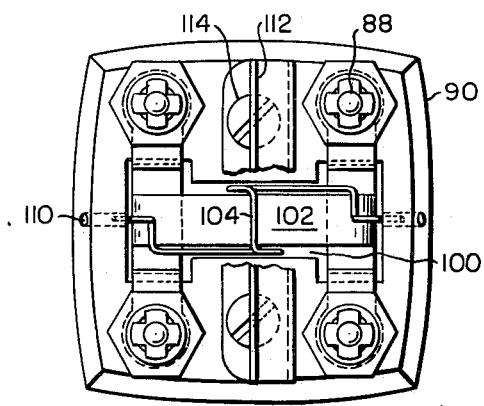

FIGS. 6 to 10 illustrate a second embodiment. FIG. 6 is a plan view. FIG. 7 is an elevation in section on line 7—7 of FIG. 6. FIG. 8 is a bottom view. FIG. 9 is a detail elevation of the contacts. FIG. 10 is an elevation in section on line 10—10 of FIG. 6.

FIGS. 11 to 17 illustrate a third embodiment. FIG. 11 is a plan view. FIG. 12 is an elevation in section on line 12—12 of FIG. 11. FIG. 13 is a bottom view. FIG. 14 is a detail elevation of the contacts. FIG. 15 is an elevation in section on line 15—15 of FIG. 11. FIG. 16 is an elevation in section on line 16—16 of FIG. 11. FIG. 17 is a diagonal projection of the ground trough.

The embodiment of FIGS. 1 to 4 is of the type having specially shaped terminals which not only complete the electrical circuits but also serve as guides for the component leads. This device, designated generally as 8, also incorporates a rotatable turret feature. It comprises a body 10 which may be fabricated from cast aluminum. The body 10 is hollow and includes a top wall 11. Rotatably mounted on the top wall 11 of the base is a turntable 12 preferably fabricated of molded, electrically insulating plastic. The turntable 12 is formed with a pair of upstanding parallel ridges 14 within each of which is mounted a pair of narrow, elongated, longitudinally aligned, electrically conducting support members or rails 16 and 18. As will be later seen, the rails 16 and 18 provide means for guiding an electronic component, such as a diode, into work holding engagement with the device, supporting the component and at the same time providing electrical contacts for use in testing the diode. Accordingly, it is preferred that the rails be fabricated from a suitable contact material such as brass plate with a silver rhodium plating. The rails are fabricated of a non-ferromagnetic material.

Figure 2:
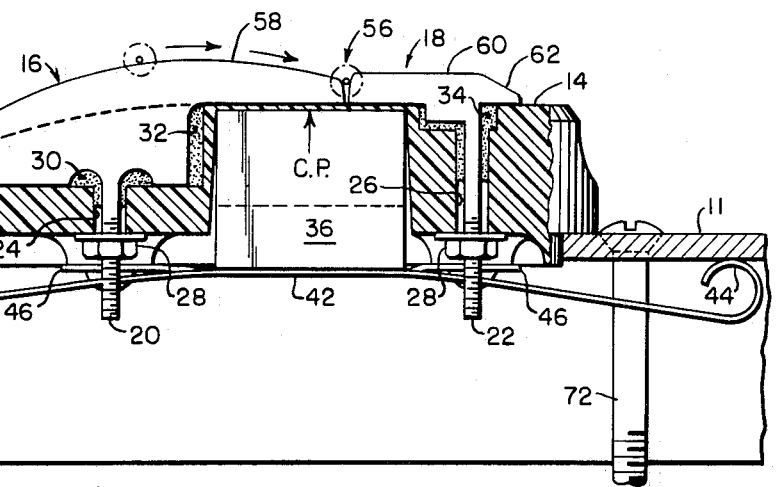
FIG. 2 is an enlarged elevation, partly in section, of the device of FIG. 1.
Figure 3:
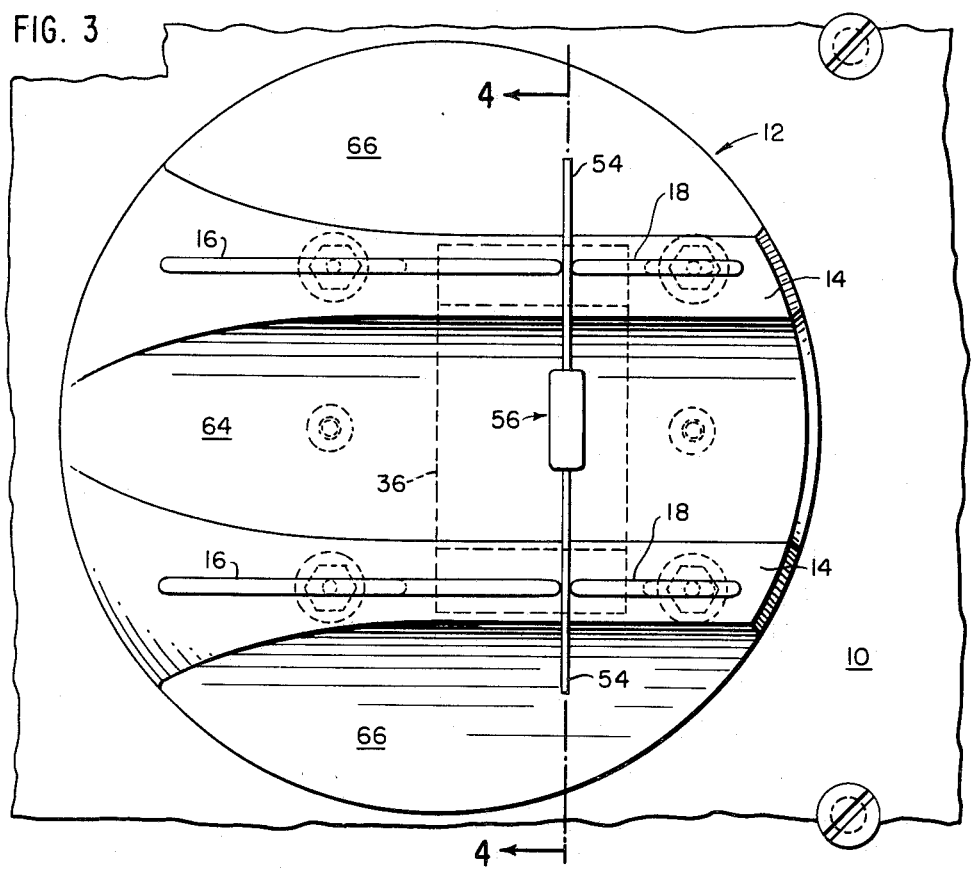
FIG. 3 is a fragmentary plan view of the device of FIG. 1.

The rails 16 and 18 include depending integral studs 20, 22 respectively. As shown in FIG. 2 the rails are received in slots in the ridges 14 of turntable 12 with the studs 20 and 22 respectively extending downwardly through openings 24, 26, in the turntable, and in registry with the slots. Also, as most clearly shown in FIG. 2, the openings 24 and 26 have a diameter substantially in excess of the diameter of the studs 20 and 22 thereby permitting adjustment of the rails longitudinally of themselves and of the slots receiving the rails. In assembling the device, the rails are adjusted relative to each other and longitudinally of themselves to provide a predetermined spacing of the next adjacent ends of the rails, whereupon nuts 28 on the studs 20 and 22 may be tightened to secure the rails in the selected adjusted position. In order to assure that the rails will remain in the desired position, a quantity of suitable potting compound or cement, such as at 30, 32 and 34, is disposed within the spaces between the studs 20, 22 and the turntable body as well as between the rails and turntable body. I prefer to use a cement which will not harden immediately but rather which will require an interval to set which is sufficient to permit fine adjustment of the rails relative to each other before the cement hardens to lock the rails in place.

Figure 4:
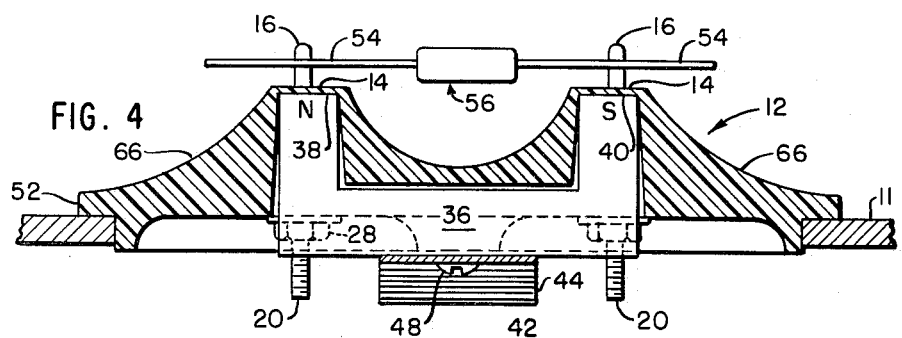
FIG. 4 is a fragmentary cross sectional view, substantially along the line 4—4 of FIG. 3.

The turntable 12 is also provided with an internal cavity opening downwardly and in which is disposed a permanent magnet 36. As best shown in FIG. 4, the magnet 36 is U-shaped and has a pair of elongated, rectangular pole faces 38 and 40 extending parallel to and underlying the ridges 14 of the turntable. Also, as clearly shown in FIGS. 2 and 4, the wall section of the turntable between the pole faces 38 and 40 and the top surface of the ridges 14 is relatively small. For example, in a specific embodiment utilizing a turntable having a diameter of approximately three inches, and wherein the top surfaces of the ridges 14 were approximately 5/16" in width, the thickness of the wall section between the pole faces of the magnets and the top surface of the ridges was around the order of .010". In the same example of a device of this invention, the magnet utilized was approximately 1 7/16" in length, as measured across both pole faces, with the pole faces being separated approximately .950" and with the magnet having a height of approximately .625" and a width of approximately 3/4". The magnet was fabricated from Alnico V.

The magnet 36 is retained within the turntable 12 by means of a spring, generally indicated at 42, which spring also retains the turntable in assembly with the base 10 while at the same time permitting rotation of the turntable relative to the base. More specifically, the spring 42 is essentially an elongated flat leaf spring having rolled ends 44. The spring includes a pair of cantilever retaining sections 46 lanced from the body of the spring and extending in opposite directions longitudinally thereof. As shown in FIG. 4 these retaining portions 46 are provided with apertures through which extend mounting screws 48 which mount the spring on bosses on the underside of the turntable. The retaining portions 46 are spaced apart on opposite sides of the magnet 36 whereby the portion of the spring 42 between the portions 46 is flat and engages the underside of the magnet to hold the same up into the cavity on the underside of the turntable. The ends of the spring are flexed downwardly away from the top wall of the base with the rolled ends 44 of the spring resiliently and slidably engaging the underside of the top wall of the base to retain resiliently the turntable in assembly with the base. The rotatable support and mounting of the turntable on the base is provided in part by an annular skirt 50 on the turntable which is rotatably received within a correspondingly shaped aperture in the top wall 11 of the base. The turntable is further provided with a peripheral flange 52 which, as best shown in FIG. 4, has an annular undersurface resting upon the top surface of the top wall 11. Thus the turntable may be rotated relative to the base 10 with the frictional engagement between the underside of the top wall 11 and the rolled ends 44 of the spring 42 tending to retain the turntable in rotative adjusted position.

As noted above, the ends of each pair of associated rails 16 and 18 are spaced apart. More specifically, the ends of the rails are inclined and cooperate to provide a generally V-shaped notch, within which may be received the wire leads 54 extending from the opposite ends of the body of an electronic component 56, such as a diode. The next adjacent ends of each pair of rails are spaced a distance such that the leads from the diode will be received in the notch but will not bottom in the notch. In accordance with one aspect of the invention, the rails have a particular shape and orientation. More specifically, each pair of rails 16 and 18 is aligned longitudinally so that the rails are in coplanar relation. The rails 16 are greater in length than the rails 18 and have a curved work engaging top surface 58. Each work engaging surface 58 increases, continually, in distance from the pole face of the associated magnet pole, from the end of the surface 58 next adjacent the cooperating rail 18 to the other end of the rail. Further, the notch formed by each pair of rails 16 and 18 is offset from the center point CP of the associated pole faces of the magnet in a direction toward the rail 18. In the aforementioned specific example of a device constructed in accordance with this invention, this offset was approximately .055". Accordingly, when a diode or the like is dropped onto the device, with the wires of the diode bridging a pair of rails 16, the magnet will draw the diode along the rails 16 and into the notch between the rails 16 and 18. This self-locating action of the device will occur regardless of the position in which the diode is initially placed along the rail 16 as long as the lead wires of the diode bridge the rails 16. It is, of course, assumed that the component to be tested includes at least some ferromagnetic material.

Each of the rails 18 has a generally flat or horizontal top surface 60 extending parallel to the plane of the face of the associated magnet pole and terminating in a downwardly inclined end surface 62. The top work contacting surfaces 60 of the rails 18 increase in distance from the center point CP of the associated magnet pole face as the surfaces 60 progress from the point next adjacent the notch between the rails 16 and 18. Accordingly, if the diode is located so that its leads bridge the rails 18, the magnet will draw the diode along the rails and into the notch between the rails 16 and 18. As will be seen hereinafter, it is necessary that the leads of the diode or the like contact each of the rails 16 and 18 during the testing operation. In order to assure that the flexible leads on the diode, if bent, will not interferingly engage the turntable and prevent the desired seating of the leads in the notches between the rails, the ridges 14 of the turntable are separated by a relatively deep cavity 64 extending longitudinally of the rails. Further, each of the sides of the turntable alongside the rails 16 and 18 slope downwardly and outwardly to form, in effect, a cavity 66. The rails 16 and 18 are electrically insulated from each other and form electrical contacts used during the testing operation. More specifically, each of the rails is connected by a suitable electrical lead, such as shown at 68 in FIG. 1, to a terminal block 70 secured to the rear wall of the base 10. A separate lead is provided for each of the rails and a fifth ground lead extends from a terminal on the block 70 to the base 10.

Figure 5:
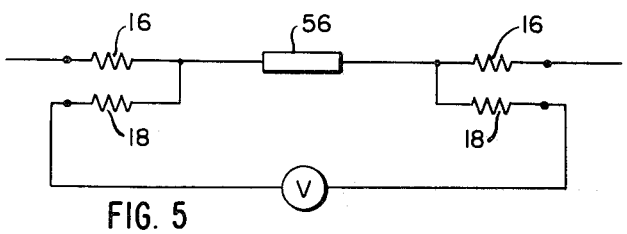
FIG. 5 is a schematic diagram illustrating a particular advantage of the device of the present invention.

In using the device of this invention, the base 10 is preferably secured to a work table or the like by mounting screws 72. The turntable is rotatably adjusted by the worker to a convenient angular location whereupon a diode is merely dropped from above the turntable in a manner so that the body of the diode is disposed generally between the pairs of rails 16 and 18, and the leads of the diode bridge the rails 16. The diode will be snapped quickly into engagement in the notch between the rails 16 and 18 with each of the diode leads in electrical contact with a rail 16 and a rail 18. The device is shown schematically in FIG. 5 where the rails 16 are represented by resistances, as are the rails 18. In FIG. 5, each associated pair of rails 16 and 18 is shown in electrical connection. However, it will be understood that this connection is provided only by the diode lead 54 engaging the rails. A suitable source of electrical power is connected, for example, to the rails 16 by suitable connection to the terminal block 70. A voltmeter is connected to the rails 18, also by suitable connection to the terminal block 70. Thus a voltage is impressed across the diode 56 by its contact with the rails 16 while the voltmeter is connected to the diode by means of the diode contact with the rails 18. There is thus provided what is referred to as a four pole contact device which minimizes contact resistance during the testing of the diode. The advantage of the four-terminal arrangement is that the voltage-measuring circuit is not completed through the diode by the contacts which carry the test current through it. The current-carrying contacts are those between the diode 56 and the rails 16. The voltage drop due to the resistance in these contacts is therefore not measured by the meter V. If the voltmeter were connected across the same terminals 16 as are connected to the input power, the voltmeter reading would reflect not only the IR drop across the diode but also that across the contacts. The current passed through the diode is sufficiently high, even though the contact resistance might be relatively low, that there would be appreciable error in the test reading due to contact resistance.

It will be seen that there is shown in FIGS. 1 to 4 a novel and improved device for bringing into position and holding small electrical components and at the same time providing a means for testing the same. While it is desirable that the leads from the diode or the like be straightened before they are placed upon the device, this is not absolutely necessary. In fact, a substantial curvature of the leads still will not result in misalignment of the diode on the device. Further, no particular care need be utilized in placing the diode on the device inasmuch as the diode will be drawn up into the notch between the rails regardless of where the diode is placed on the rails so long as the leads bridge the rails. The device is extremely simple to utilize and requires no skill or training on the part of the testing personnel. Further, the device quickly and accurately locates the diode for testing and at the same time permits quick and easy release of the diode from the device.

Also, the generally V-shaped contact configuration tends to insure a low impedance, high pressure contact, and the clearance in the region below the points of contact tends to collect any foreign matter adhering to the contacts, keeping such matter from interfering with the connections.

In this way, the contacts effectively embody a self-cleaning feature.

The embodiment of FIGS. 1 to 4, similarly to the embodiments described below, does not employ magnetized contacts. The contacts preferably have no substantial influence upon the magnetic field in their vicinity; hence, the leads of the diode being tested are caused by the magnetic field to move across the surfaces of the contacts toward the desired test positions, and do not tend to adhere to the contacts at other positions in which initial contact may be made. This represents a decided advantage over contacts which are magnetized, as previously discussed.

The embodiment of FIGS. 6 to 10 differs from that previously described mainly in that no turret is provided, and in that the rails for slidably guiding the leads are a part of the non-conductive housing or block. This unit is a four-terminal device having a first pair of generally truncated conical contacts 74 and 76 and an exactly similar pair 78 and 80. A diode 82 in test position has leads 84 which are wedged by magnetic force between the pairs of contacts in a manner similar to that previously described for the embodiment of FIGS. 1 to 4. Each contact is secured to a plug terminal in the manner described for the terminal 80. This terminal is secured to a bent metallic leaf 86 which is clamped to the base of a plug 88 and in electrical contact with the plug. The contacts and leaves are non-magnetic and may be of brass, for example.

An insulating block 90, preferably molded of a resinous material of the epoxy type, houses the four contacts, their leaves and associated plugs. The bottom of the block has drill holes in which internally threaded bushings 92 are press fitted to receive threaded ends of the plugs. As seen in FIG. 8, the block has clearance space open at the bottom to receive the contact assemblies in positions such that the contacts emerge from openings 94 in the top of the block.

The pairs of contacts are held in accurately spaced relation by insulating spacers 96 having molded button-like protrusions which enter drill holes 98 in the bottoms of the contacts. The block 90 also has a transverse clearance space 100 in which a U-shaped permanent magnet 102 is received. This magnet is held in place by a spring wire retainer 104 having loops 106 to cradle the magnet and ends 108 to snap into holes 110 drilled in the block. The poles of the magnet are flat and coplanar and rest firmly against the insulating spacers 96.

A metallic ground plate 112 between pairs of plugs 88 is secured by screws 114 to the block. This plate is preferably grounded to the test circuit and has the function of eliminating substantially the effect of capacitance between the plugs in the manner of a guard electrode.

A modification of the foregoing construction for a two-pole assembly is easily accomplished. In this case a single leaf 86 is extended and secured to both of the contacts 74 and 76 on one side, and a second leaf is similarly extended and secured to the contacts 78 and 80. Thus only two plugs are required. Also, a ground connection may be made directly to the magnet 102 whereby the latter may serve as a guard or ground electrode which is connected in a well-known manner to a measuring circuit so as to isolate from the current measurement the leakage current which does not pass through the diode under test.

Figure 1:
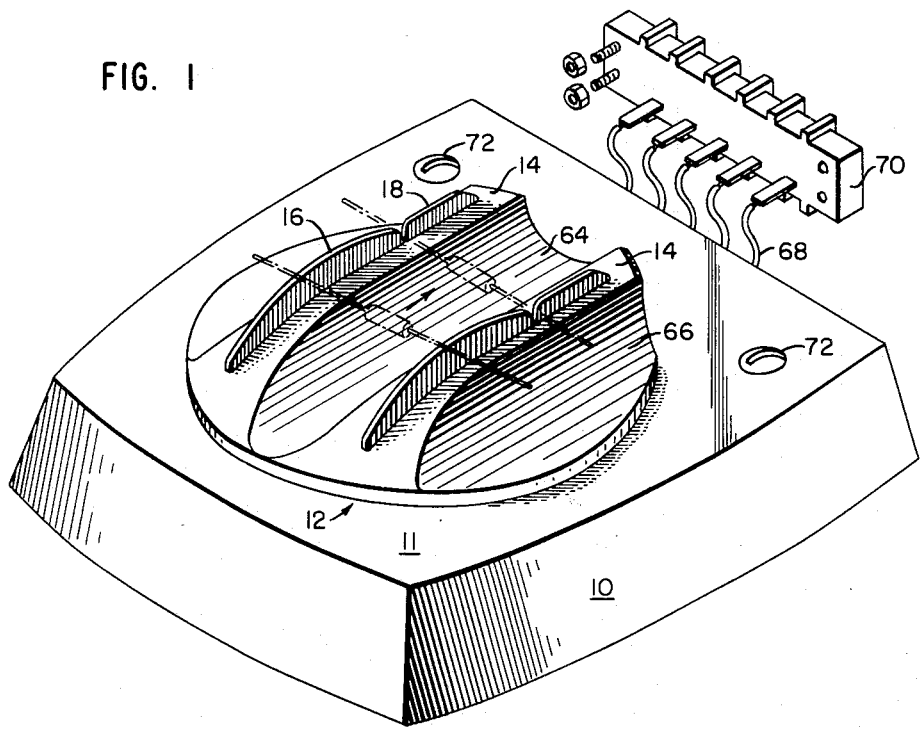

The upper surface of the block 90 is molded with two pairs of guide rails 116 and 118 which are similar in function to the rails 16 and 18 of FIG. 1. These rails have upper surfaces which slope progressively toward the magnet poles, whereby a magnet wire lead laid on the surface is attracted toward the V-shaped notch formed by the contacts which protrude between the rail ends as shown. The slope of these rails is clearly shown in FIG. 10. As in FIG. 1, a saddle 120 between the rails of each pair provides clearance for the diode under test.

The embodiment of FIGS. 11 to 17 is intended for applications in which the device being tested, for example a diode, is to have its response measured over a very short time interval or at very high frequencies. At such frequencies measurements using conventional equipment tend to reflect certain capacitance and inductance not attributable to the device under test but to the lead-in connections. In this embodiment the problem is minimized by a coaxial design in which the holder is a high frequency transmission line having a characteristic impedance appearing substantially resistive. A block 122 is provided which in external configuration is substantially like that described in the embodiment of FIGS. 6 to 10. The embodiment described is a two-terminal device having coaxial connectors 124 and 126. FIGS. 14 and 15 illustrate details of the connector construction. A non-magnetic metal ferrule 128 of brass or the like is adapted to be connected to the grounded outer conductor of a coaxial cable (not illustrated) by a conventional friction fitting. The ferrule has a shoulder 129 upset against a metallic mounting plate 130 fastened by screws 132 to the block 122. The ferrule 128 has a longitudinal hole throughout its length in which a hollow cylindrical insulating bushing 134 is fitted. Within this bushing is fitted a non-magnetic metal pin 136 to be connected with the center conductor of the coaxial cable in the fitting.

A ground cradle 138, sometimes also called a "ground plane," is fitted over shoulders 140 on each of the ferrules, and is soldered thereto. This cradle is formed from a sheet of a non-magnetic metal such as copper, and in its central region it is provided with spaced parallel side portions 142. The block 122 has an opening 144 which extends through the body of the block to permit the yoke to emerge in exposed position when received in assembled relation to the connectors 124 and 126 through the bottom of the block. The yoke 138 is also provided with flats 146 and 148 in which there are holes 150 and 152 to be fitted over the shoulders 140 of the ferrules.

An insulating spacer plate 154 having a hole for the pin 136 is received over the latter, and a non-magnetic metallic contact assembly 156 is soldered to a shoulder 158 on a radially enlarged section of the pin. This assembly comprises a flat plate 160 and truncated conical contacts 162 fastened thereto. The thickness of the spacer 154 is such as to space the plate 160 from the flat on the cradle 138 (FIG. 14) to provide substantially the same characteristic impedance as the coaxial connectors 124 and 126.

The retainer plate 130 has a central portion cut out to provide bent spring leaves 164 and 166 which retain a U-shaped permanent magnet 168 in position with one pole bearing upon each of the flats 146 and 148 of the cradle 138. The contacts 162 are located so that they directly overlie the pole ends of the magnet.

It will be apparent from the foregoing construction that the coaxial connectors extend uninterruptedly from the points of external connection directly to the contact assemblies 156, and that the cradle 138 extends the ground plane between the coaxial connectors. In this way the transmission line design is continued so that upon the insertion of a diode, the diode becomes the center conductor of the line and the cradle 138 is the trough of an unbalanced transmission line, that is, a line in which one conductor is grounded and the other is at a different potential. Thereby the characteristic impedance of the line is preserved as much as possible.

As in the embodiment of FIGS. 6 to 10, the block 122 is provided with integral sloped locating surfaces or rails 172 by which the magnet attracts the leads of the diode 170 under test into contact with the contact assemblies 156, as will be evident from the foregoing description of said embodiment.

While the invention has been described in the terms of specific embodiments, it will, of course, be understood that various changes and modifications could be made in the structure described and shown herein without departing from the scope or spirit of the invention. Accordingly, it is understood that the foregoing description and accompanying drawings are primarily illustrative in nature and are not intended to be limiting.

It is also to be understood that the language in the following claims is intended to cover all of the generic and specific features of the invention herein described and all statements of the scope of the invention which, as a matter of language, might be said to fall therebetween.

Having described my invention, I claim:

1. A work holder for use in testing electronic components and the like comprising a pair of aligned elongated electrically conductive non-magnetic support members, the next adjacent ends of said support members cooperating to provide a notch, a second pair of said support members extending parallel to said first pair with the notches formed by both pairs being in alignment, and means providing a pair of magnet poles respectively underlying said notches.

2. A work holder for use in testing electronic components and the like comprising a pair of aligned elongated electrically conductive non-magnetic support members, the next adjacent ends of said support members being spaced apart and cooperating to provide a notch, a second pair of said support members extending parallel to said first pair with the notches formed by both pairs being in alignment, said support members being electrically insulated from each other, a permanent magnet having a pair of poles respectively underlying said notches, and a plurality of electrical terminals respectively connected to said support members.

3. A work holder for use in testing electronic components and the like comprising a pair of aligned elongated electrically conductive non-magnetic rails, the next adjacent ends of said rails being spaced apart and cooperating to form a notch, a second pair of said rails extending parallel to the first pair with the notches formed by both pairs being in alignment, and means providing a pair of magnet poles respectively underlying said notches with the centers of the poles being offset from said notches and longitudinally of the rails.

4. A work holder for use in testing electronic components and the like comprising a pair of aligned elongated non-magnetic rails, the next adjacent ends of said rails cooperating to form a notch, a second pair of said rails extending parallel to the first pair with the notches formed by both pairs being in alignment, and means providing a pair of magnet poles respectively underlying said notches, one of the rails of each of said pair and the corresponding rail of the other pair having a sloped upper surface which from next adjacent the associated notch increases progressively in distance from the face of the underlying magnet pole.

5. A work holder for use in testing electronic components and the like comprising a pair of aligned elongated electrically conductive non-magnetic rails, the next adjacent ends of said rails being spaced apart and cooperating to form a notch, a second pair of said rails extending parallel to the first pair with the notches formed by both pairs being in alignment, and means providing a pair of magnet poles respectively underlying said notches and offset therefrom longitudinally of said notches, one of the rails of each of said pair and the corresponding rail of the other pair having a curved upper work contacting surface which from next adjacent the associated notch increases progressively in distance from the face of the underlying magnet pole.

6. In a work holder as described in claim 5, said rails each being electrically insulated from the other, and a plurality of electrical terminals connected respectively to said rails.

7. A work holder for use in testing electronic components and the like comprising a base, a turntable rotatably supported on the base, a pair of aligned non-magnetic rails mounted on the turntable, the next adjacent ends of said pair of rails cooperating to form a notch, a second pair of said rails mounted on the turntable and extending parallel to the first pair with the notches formed by both pairs of rails being in alignment, and a permanent magnet supported on the turntable and having a pair of pole faces respectively underlying said notches.

8. In a work holder as described in claim 7, one of the rails of each pair and the corresponding rail of the other pair having a curved work contacting upper surface, the other rail of each pair having a substantially straight work contacting upper surface, said pole faces being offset from said notches in the direction of said other rail of each pair of rails, each of said curved surfaces from next adjacent the associated notch increasing progressively in distance from the underlying pole face.

9. In a work holder as described in claim 8, said magnet being generally U-shaped and fitting into a cavity in the underside of said turntable, a leaf spring having a center portion mounted on the underside of the turntable and supporting said magnet in said cavity, said spring having ends extending from said center portion and terminating outwardly of the turntable in resilient sliding engagement with said base thereby retaining said turntable on said base.

10. In a work holder as described in claim 8, said turntable having a relatively deep elongated concavity extending parallel to and disposed between the first and second pair of rails, and the sides of the turntable alongside the rails and opposite said concavity being relieved.

11. In a work holder as described in claim 8, a terminal block on said base and including a plurality of electric terminals, each of said rails being electrically insulated from each other, and means respectively connecting said terminals to said rails.

12. In a work holder as described in claim 11, said turntable having slots in which said rails are received, each of said rails including a member extending downwardly through an aperture in said turntable, and means engaged with each said member and the turntable to hold the rails in assembly with the turntable, the apertures receiving each said member being larger than said member to permit initial adjustment of said rails longitudinally of said slots to adjust the size of said notches.

13. A work holder for testing electrical components comprising, in combination, a non-magnetic block, a magnet supported by the block and provided with a pair of poles, separate electrical contact means supported by the block adjacent each of said poles, and electrical insulation means separating said contacts, said contact means being substantially non-magnetic, said block being provided with a locating surface describing a path which approaches a pole as it approaches the contact means adjacent thereto.

14. The combination according to claim 13, in which a coaxial connector is connected to each contact means and including a metallic shield connecting the outer conductors of said connectors adjacent to said contact means.

15. The combination according to claim 13, wherein the contact means adjacent each pole comprise a pair of mutually insulated contact elements in position to be connected through a lead on the component to be tested which is placed therebetween.

16. A work holder for testing electrical components comprising, in combination, a pair of substantially non-magnetic electrical contacts, means to support the contacts in spaced relationship, and magnet means having a pole adjacent each contact, said work holder including a substantially non-magnetic portion having a locating surface describing a path which approaches a pole as it approaches the contact means adjacent thereto.

17. A work holder for testing electrical components comprising, in combination, magnet means provided with a pair of poles, at least two electrical, substantially non-magnetic contact means, and non-magnetic support means having provision to support at least one contact means adjacent each pole with said contact means in mutually insulated relationship, at least one of the contact means and support means also having a work locating surface describing a path of increasing magnetic attraction toward a position near a pole wherein the work touches the contact means.

References Cited by the Examiner
UNITED STATES PATENTS

| | | | |
|---|---|---|---|
| 2,723,763 | 11/1955 | Baldwin | 211—78 |
| 3,038,139 | 6/1962 | Bonanno | 339—12 |

OTHER REFERENCES

Electromechanical Design, September 1961, pages 24 and 26.

JOSEPH D. SEERS, *Primary Examiner.*

PATRICK A. CLIFFORD, *Examiner.*